United States Patent

[11] 3,602,907

[72] Inventor Gottfried Tschannen
Zurich, Switzerland
[21] Appl. No. 797,541
[22] Filed Feb. 7, 1969
[45] Patented Aug. 31, 1971
[73] Assignee Siemens Aktiengesellschaft
Berlin and Munich, Germany
[32] Priority Feb. 8, 1968
[33] Switzerland
[31] 1881

[54] CIRCUIT ARRANGEMENT FOR THE SUPERVISION OF A DOUBLE-CURRENT SCANNING CIRCUIT WITH REGARD TO CURRENT FLOW
3 Claims, 10 Drawing Figs.

[52] U.S. Cl. .......... 340/174 HB, 307/88
[51] Int. Cl. .......... G11c 7/00, G11c 11/06
[50] Field of Search .......... 340/174; 307/88; 178/69 G

[56] References Cited
UNITED STATES PATENTS
3,471,709 10/1969 Vander Haagen .......... 307/88

*Primary Examiner*—James W. Moffitt
*Attorney*—Birch, Swindler, McKie & Beckett

ABSTRACT: A circuit arrangement for the supervision of a double-current scanning circuit with regard to current flow having an inquiry pulse circuit. First and second magnetic ring cores with substantially rectangular hysteresis loops, each core having associated windings connected to the scanning and inquiry pulse circuits to effect oppositely directed magnetization of the scanning circuit current, in response to the scanning and inquiry pulse circuit currents to produce reading pulses are provided. A source for applying the reading pulses to a bistable switching stage and a pulse supervision circuit control to the bistable switching stage to a first stable condition in response to reading pulses, and a connection between the bistable switching device and the pulse supervision circuit to control the bistable switching device to a predetermined second stable condition in the absence of reading pulses are also provided.

CIRCUIT ARRANGEMENT FOR THE SUPERVISION OF A DOUBLE-CURRENT SCANNING CIRCUIT WITH REGARD TO CURRENT FLOW

BACKGROUND OF THE INVENTION

1. Field of the Invention

The invention concerns a circuit arrangement for the supervision of a double-current scanning circuit with regard to current flow. It has particular use in teletype systems.

2. Description of the Prior Art

It is necessary in teletype transmission and receiving installations and in exchange equipment for teletype connections to supervise the continuity of the connection. If interruptions occur in the connection, the teleprinters would remain seized unnecessarily and "run through" and exchange systems would be blocked. In the case of a double-current scanning circuit, it is known that the supervision can be carried out by use of a current direction-independent, delayed relay as the control element.

In modern installations having electronic circuits in the form of printed integrated circuits, the positioning of the individual relays causes difficulties. Relays also require maintenance and are subject to wear.

SUMMARY OF THE INVENTION

The invention makes possible the supervision of a double-current scanning circuit without relays. Instead, switching elements that can be inserted harmoniously into electronic installations are used which provide electrical separation of the scanning and supervision circuits.

The invention as applicable in direct current telegraphy systems having low signal voltages as customarily used for distances up to approximately 25 kilometers. It has particular use in association with local lines.

The circuit arrangement according to the invention is characterized by the fact that the windings of two magnetic ring cores having rectangular hysteresis loops are connected with the scanning circuit and an inquiry impulse circuit in such a way that, with current direction reversal in the scanning circuit, the two magnetic cores are alternately magnetizable in the opposite direction by the scanning circuit current and the inquiry pulse current; and, in response thereto, emits reading pulses that are synchronous with the inquiry pulses. The reading pulses are applied to a bistable switching or flip-flop stage and a pulse supervision circuit. The bistable flip-flop stage is controllable by the reading pulses of the one or the other magnetic cores into a first stable condition, and may be switched over a connection with the pulse supervision circuit into a second predetermined stable condition in response to the nonappearance of the reading pulses.

A pulse circuit connected to a counting pulse current source and the reading windings of both magnetic ring cores can be used as the pulse supervision circuit. The counting circuit can be controlled in the forward count direction by the counting pulses, and can be reset by the reading pulses. After the nonappearance of reading pulses and when a predetermined count is obtained, the counting circuit can switch the bistable switching stage into a stable state that is predetermined to be indicative of a particular circuit condition.

A bistable flip-flop stage may be used as a pulse count circuit. The flip-flop stage is connected in series circuit with one reading winding of each of the two magnetic cores. The flip-flop stage can be switched into a stable predetermined state by an output pulse resulting in the flip-flop stage at the second counting pulse, upon the nonappearance of the reading pulses.

The predetermination that one of the two stable states indicates a disturbance is necessary as, for example, point-point connections may be interrupted by a separation current, whereas connections over exchange systems may be interrupted by a signal current.

BRIEF DESCRIPTION OF THE DRAWINGS

FIG. 2*a* –2*i* are pulse diagrams indicating the conditions at various points in the circuit of FIG. 1 that serve to explain the operation thereof.

DETAILED DESCRIPTION OF THE INVENTION

Figures 1, 2:
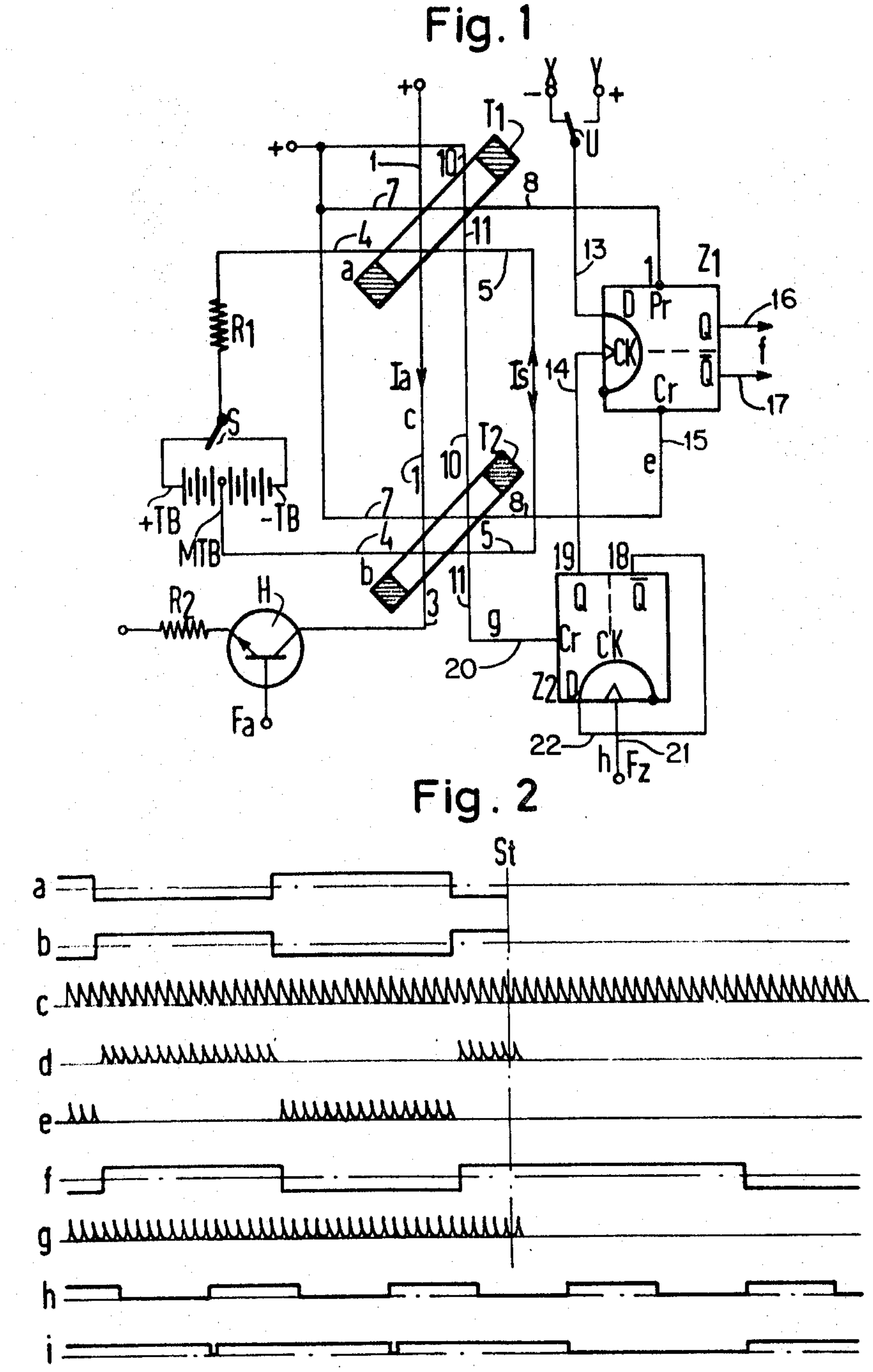
FIG. 1 shows a circuit arrangement according to the invention.

The double-current scanning circuit according to the invention comprises the battery having terminals +TB, −TB and MTB, scanning contact S, resistor R1, and windings having ends 4 and 5, hereinafter referred to as winding 4–5 of magnetic ring cores T1 and T2. The inquiry pulse circuit comprises windings having ends 1 and 3, hereinafter referred to as winding 1–3 of the two magnetic ring cores T1 and T2, transistor H, the base connection thereof being connected to source of synchronization signals at frequency F*a*, and resistor R2.

The reading winding having ends 7 and 8 and hereinafter referred to as winding 7–8 of magnetic ring core T1 is connected between the positive supply source (+) and recontrolling "preset" connection 12, reading winding 7–8 of magnetic core T2 is connected between the positive supply source (+) and recontrolling "clear" connection 5, and of bistable, integrated switching stage Z1. The reading windings having ends 10 and 11 and hereinafter referred to as winding 10–11 of the magnetic ring cores are connected in series between the positive supply terminal (+) and resetting "clear" connection 20 of bistable, integrated flip-flop stage Z2. Signals at counter frequency F*z* are applied to "clock" connection 21 of bistable flip-flop stage Z2 and output connection 19 (Q) is connected to "clock" connection 14 of bistable switching stage Z1. To connection 13 (D) of the latter, either the negative potential of clamp X or the positive potential of clamp Y can be applied through commutator U. Connections 16 and 17 (Q and $\overline{Q}$) designate the output connections of bistable switching stage Z1 and forward the signals scanned in the roster of inquiry frequency F*a;* however, they are electrically separated from the scanning circuit. The two bistable integrated stages function as a double D flip-flop in transistor-transistor logic.

Current I*s* in the scanning circuit magnetizes the two magnetic ring cores in opposite directions as it simultaneously flows through the winding of magnetic core T1 from connection 4 to connection 5, and the winding of magnetic core T2 its connection from 5 to its connection 4 (or vice versa), depending on the position of scanning contact S. This is shown in FIG. 2 by the mirror-image diagrams *a* and *b*.

The inquiry current I*a* flows through windings 1–3 of both magnetic ring cores to effect magnetization thereof in the same direction. The inquiry pulses are shown in pulse diagram *c*. The inquiry frequency F*a* is selected such that distortion of the scanning pulses resulting from the inquiry is negligible. For a scanning speed of 50 Baud, for example, the inquiry frequency would be 800 Hz. The sum of the magnetization of each magnetic ring core resulting from the scanning and inquiry current always causes reading pulses to be produced in reading windings 7–8 and 10–11 when the inquiry current acts oppositely to the scanning current. This is shown in diagrams *d*, *e* and *g*. The reading pulses of the individual magnetic ring cores change the condition of bistable switching stage Z1, because they alternately are applied to connections 12 and 15. The reading pulses of both magnetic ring cores together effect the resetting of bistable flip-flop stage Z2, which is controlled forward by counter pulses F2. Diagram *h* shows counter pulses F*z* having a frequency, for example, of 50 Hz.

As output 18 ($\overline{Q}$) of bistable flip-flop stage Z2 is connected to input 22 (D) thereof, this stage switches into the other condition in response to each positive-going edge of the counter pulses. Due to resetting by reading pulses *g* there occurs at the output 19 connection (Q) alternation positive and zero potentials as shown in diagram *i*. The clock-input of stage Z1 receives the positive-going edge of the pulses at output connection 19 (Q) of flip-flop stage Z2. As long as inputs "preset" 12 and "clear" 15 of stage Z1 receive the reading pulses *d* or *e*, receipt of the positive-going edge of said pulses from stage Z2 remains without effect because with application of such simultaneous pulses, these at the connections "preset" and "clear" have priority as compared to those at connection "clock."

After interruption of the scanning circuit, for example at time S*t*, reading pulses no longer result because magnetization of the magnetic ring cores cannot occur. The resetting of bistable flip-flop stage Z2 does not occur and at the second counter pulse, an output pulse is produced at connection 19 which switches bistable switching stage Z1 into the predetermined condition with the positive flank. The condition to be produced can be selected by commutator U. For example, there appears with the marked output connection to the potential of clamp X at the interruption in the scanning circuit, separation potential (+) at output connection 16 of stage Z1, with the connection to the potential clamp Y, signal potential appears thereat. Opposite potentials always are produced at connections 16 and 17.

I claim:

1. A circuit arrangement for the supervision of a double-current scanning circuit with regard to current flow having an inquiry pulse circuit comprising:

first (T1) and second (T2) magnetic ring cores with substantially rectangular hysteresis loops, each core having associated windings connected to the scanning and inquiry pulse circuits to effect oppositely directed magnetization of one of the first and second magnetic cores, upon reversal of direction of the scanning circuit current, in response to the scanning and inquiry pulse circuit currents to produce reading pulses, a bistable switching stage (Z1)

a pulse supervision circuit (Z2)

means to apply the reading pulses to the bistable switching stage (Z1) and the pulse supervision circuit (Z2) to control the bistable switching stage to a first stable condition in response to reading pulses.

connection means between the bistable switch device and the pulse supervision circuit to control the bistable switching device to a predetermined second stable connection in the absence of reading pulses.

2. A circuit arrangement as recited in claim 1 wherein the pulse supervision circuits (Z2) comprises a pulse counter circuit connected to a counter pulse current source (Fz) and the reading windings of the first and second magnetic ring cores, the pulse counter circuit being controllable forward by the count pulses (*h*) and resettable by the reading pulses (*g*), the bistable switching stage (Z1) being controllable by the pulse counter circuit to the predetermined condition when the latter provides a predetermined count, in the absence of reading pulses (*d*, *e*, *g*).

3. A circuit arrangement as recited in claim 2 wherein the pulse counter circuit comprises a bistable flip-flop stage (Z2) connected to the series circuit of one reading winding each (10–11) of the first and second magnetic ring cores, the bistable switching stage (Z1) being controllable by an output pulse (*i*) resulting in response to the second counter pulse after the nonappearance of reading pulses in the bistable flip-flop stage, to its predetermined condition.